United States Patent [19]

Muellenberg

[11] Patent Number: 5,009,539
[45] Date of Patent: Apr. 23, 1991

[54] CLAMPING SET WITH SCREW SLEEVE

[76] Inventor: Ralph Muellenberg, Im Wiesengrund 6, D-4048 Grevenbroich 12, Fed. Rep. of Germany

[21] Appl. No.: 389,890

[22] Filed: Aug. 4, 1989

[30] Foreign Application Priority Data

Aug. 6, 1988 [DE] Fed. Rep. of Germany ....... 3826849

[51] Int. Cl.⁵ .............................................. B25G 3/20
[52] U.S. Cl. .................................. 403/370; 403/371; 279/49
[58] Field of Search .................. 403/370, 371; 279/49, 279/48, 47

[56] References Cited

U.S. PATENT DOCUMENTS

| 611,159 | 9/1898 | Webb | 279/49 |
|---|---|---|---|
| 1,577,015 | 3/1926 | Glaze | 279/48 UX |
| 4,202,644 | 5/1980 | Soussloff | 403/369 |
| 4,268,185 | 5/1981 | Muellenberg | 403/16 |
| 4,345,851 | 8/1982 | Soussloff | 403/369 |

FOREIGN PATENT DOCUMENTS

| 155736 | 3/1939 | Austria | 403/370 |
|---|---|---|---|
| 0007217 | 1/1980 | European Pat. Off. . | |
| 361919 | 10/1920 | Fed. Rep. of Germany | 403/370 |
| 894339 | 9/1953 | Fed. Rep. of Germany . | |
| 3444608 | 6/1986 | Fed. Rep. of Germany . | |
| 265280 | 11/1949 | Switzerland . | |

Primary Examiner—Andrew V. Kundrat
Attorney, Agent, or Firm—Foley & Lardner

[57] ABSTRACT

A clamping arrangement includes taper sleeves which are movable axially towards each other and upon movement in a specific direction open outward radially, so that an outer component can be clamped on a shaft. The axial displacement of the taper sleeves towards each other takes place by means of a screw sleeve with threads of differing pitch, engaging in corresponding threads on the ends of the taper sleeves lying outside a clamping region. The clamping can be produced or released by turning the screw sleeve in one direction or the other.

31 Claims, 3 Drawing Sheets

CLAMPING SET WITH SCREW SLEEVE

BACKGROUND OF THE INVENTION

1. Field of the Invention

The present invention relates to a clamping set for the transmission of torques, and more particularly, to a clamping set.

2. Discussion of the Related Art

German Offenlegungsschrift 3,444,608 discloses a typical clamping set. A clamping set, as used here, means a clamping arrangement forming a structural unit and having a cylindrical inner peripheral face and a cylindrical outer peripheral face which can be inserted, for example, in the space between the outer peripheral face of a shaft and the inner peripheral face of an external component surrounding the shaft. This means that neither the shaft nor the outer component to be clamped requires a special machining of the peripheral faces. In particular, conical faces need not be provided, which in many, particular heavy components requires considerable additional machining.

The above clamping set comprises two taper bushings which, during clamping, are axially displaced towards each other through tightening of a screw sleeve In the process, the taper bushings open out radially while gliding over the taper faces, thereby causing a clamping of the outer component on the shaft. The inner taper bushing is axially connected to the taper face through an external thread onto which the internally threaded screw sleeve can be screwed. The screw sleeve rests axially against the outer taper bushing and produces the axial displacement thereof when turned. The screw sleeve has an axial extension which at its end has a collar projecting radially outwards with elastic expansion of a slit end of the outer taper bushing. The collar snaps into a corresponding inner peripheral groove of said bushing, so that the screw sleeve, which is screwed onto the inner taper bushing, can both pull and press axially at the outer taper bushing, and the clamping set can be both tightened and released by means of the screw sleeve.

A similar clamping set assembly is described in European Patent Specification 7 217, but in this case the screw sleeve engages in an outer peripheral groove of the outer taper ring.

The common feature of both these prior devices is that, although great axial forces can be applied during clamping through direct contact of the screw sleeve, for the releasing operation the engagement of radially projecting collars in grooves of the other element is necessary. This results in additional expense, design difficulties, and limitations in the ability to absorb axial forces, because the collars provide only the engaging flank whose engagement depth cannot be great due to design and/or fitting reasons.

If, however, the taper angles were self-locking and have a flat taper angle within the self-locking region, so that the self-locking effect is very marked, the forces required for axial removal of the taper surfaces from one another are considerable and exceed the values which can be applied with the known designs, especially with larger shaft diameters.

SUMMARY OF THE INVENTION

An object of the present invention is to provide a clamping set which can be clamped and released with great force.

The foregoing and additional objects are attained by providing a clamping set wherein the elements carrying the clamping taper faces can be either axially drawn onto each other or axially pressed apart, depending on the direction of turning. This is accomplished through the use of a screw sleeve with threads of different pitch. No outer stops are required, because the screw sleeve is axially connected to the two elements bearing the taper faces by means of the treads and is capable of transmitting both the clamping and the releasing forces in the same order of magnitude. Furthermore, there is no need for special designs for releasing the taper bushings which through the self-locking angles convert the axial clamping forces with great efficiency into radial clamping forces, but for the same reason remain fixed on top of each other when the clamping is complete even after removal of the axial clamping forces A thread provides several contact surfaces depending on the number of its flanks, so that the load of the individual contact surface is correspondingly reduced. Also, the axially transmittable force is increased considerably compared with the engaging collars of the state of the art. The fitting of threads is simpler in manufacturing terms than the production of undercut recesses and/or collars, which when being fitted then have to be snapped in with elastic deformation of at least one of the adjoining parts.

A screw sleeve with threads running in opposite directions on a pipe coupling is disclosed in German Patent Specification 894,339. In this known device, however, the taper faces lie at the same height as the screw sleeve, so that the radial overall height of the elements bearing the taper faces and that of the screw sleeve add together, which sometimes leads to inadmissible projections.

A major advantage of the present invention, on the other hand, is that the region of the screw sleeve and the clamping region of the taper faces lie axially behind one another, so that in the region of the taper faces a design which is radially independent of the screw arrangement is possible and requires very little space in the clamping region of the taper surfaces. The inner peripheral face of the outer component thus only needs a diameter which is slightly larger than the shaft.

A screw sleeve with counter-running threads is also shown in Swiss Patent Specification 265,280. However, this is not a clamping set, for the single taper face is disposed directly on the outer component. The threads of the screw sleeve are formed as internal and external threads, which increases the overall radial height of the arrangement. The taper angles are not self-locking, which means that the transmittable torque is only relatively small.

In a preferred embodiment the screw sleeve has both a right-hand and a left-hand thread. This has, inter alia, the advantage that greater clamping distances to overcome a tolerance-produced play can be travelled relatively quickly.

Another embodiment uses threads of differing pitches running in the same direction to produce an axial movement of the parts towards each other. If strong threads with only slightly different pitches are selected, particularly high axial forces and particularly high transmittable torques can be produced with a given torque on the screw sleeve. The radii of the threads can be the same of different from each other, depending on the structural layout for each individual case.

Further, in order to avoid losses in the tightening torque through thread friction, it can be advantageous to form at least one of the threads as a ball circulating thread.

In a particularly advantageous arrangement, the threaded extension is provided on the thin-walled end of the outer taper bushing. During tightening, the outer taper bushing is drawn onto the inner taper part. If in this embodiment the outer component resting on the outer taper bushing has to be fixed in the axial direction during tightening, a longitudinal stop may be provided. If the taper faces extend under the threaded extension, the latter is also opened out during tightening of the clamping set. As a result of this, the thread cover on this threaded extension improves with increasing clamping force. Thus, the contact surface in the thread increases. In this way the surface pressure in this thread can be kept low.

In another possible embodiment the lengthwise shift of the outer taper ring does not take place by pulling, but by lengthwise pushing. In this case a longitudinal stop, for example in the form of a diametral shoulder, can be provided in the lengthwise direction on the shaft in order to fix the outer component.

During tightening of the screw sleeve, full rotation of the inner taper ring without that of the inner taper element generally does not take place, so that no special measures to make these parts stop turning during tightening are necessary.

However, in order to be independent of the adhesion of the inner taper ring to the shaft and also to be able to bring about a torque transmission, it may be advisable to have a turning tool resting on the outer component. The torque during clamping of the clamping set then leads only to forces remaining inside the clamping arrangement, so that slipping is no longer possible.

In a further embodiment the turning tool comprises a toothed pinion, whose pitch diameter is much smaller than the diameter of the screw sleeve. If there is turning on the pinion through suitable means, for example a wrench or a crank, a torque transmission takes place according to the diameter ratio.

The counter-toothing to the pinion can be provided directly on the outer periphery of the screw sleeve or on the outer periphery of special tool which can be placed so that it cannot rotate on the screw sleeve.

The tool can generally be inserted only from the side on the screw sleeve, which then has a polygonal outer periphery, on which the tool can be placed in various angular positions. The toothing then does not have to go over the entire periphery, but needs only take in a circular arch corresponding to the angle difference between two different positions of the tool on the screw sleeve.

For mounting and supporting the pinion on the outer component the present invention contemplates a pin which can be rotatable in the bore or can be fixed with pinions which rotate about the pin.

The present invention further contemplates a torque support which acts when the maximum torque is transgressed. Accordingly, when the clamping set slides through, the torque support leads to the release of the screw sleeve in order to avoid damages of the shaft and the inner taper ring or fasten the screw sleeve more tightly and thereby the clamping set.

Further objects and advantages of the present invention will become apparent to those of skill in the art from the detailed description and drawings which follow.

DETAILED DESCRIPTION OF THE PREFERRED EMBODIMENTS

Figure 1:
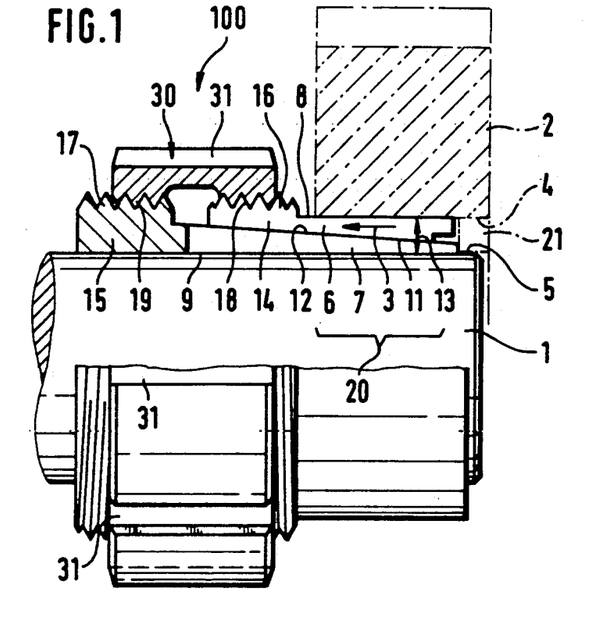
FIG. 1 is a side view of a first embodiment of the invention, partially in a longitudinal section through the axis.

The present invention contemplates a clamping set 100 as shown in FIG. 1. A toothed gear 2 (shown in phantom), forming the outer component, and arranged on a shaft 1 forming the inner component, can be clamped by means of the clamping set. The toothed gear 2 has a central recess with a cylindrical inner peripheral face 4 which has a slightly larger diameter than the cylindrical outer peripheral face 5 of the shaft 1, which engages concentrically in the recess. The right ends of an outer taper bushing 6 and of an inner taper bushing 7 are arranged one on top of the other and engage in the space between the inner peripheral face and outer peripheral face 5. The outer taper bushing 6 has a cylindrical outer peripheral face 8, with which it rests against the inner peripheral face 4 of the outer component 2. The inner peripheral face of the outer taper sleeve 6 forms an inner taper face 11 with self-locking taper angle. The inner taper face 11 rests on an outer taper face 12 of the inner taper sleeve 7, which in turn rests with its cylindrical inner peripheral face 9 on the cylindrical outer peripheral face 5 of the shaft 1.

If the outer taper bushing 6 is displaced axially in the direction of the arrow 3 relative to the inner taper bushing 7, a radial enlargement in the direction of the arrow 13 takes place in the clamping region formed by the taper faces 11, 12, thereby causing the toothed gear 2 to be clamped on the shaft 1.

In order to convert as much as possible of the applied axial displacement force into radial clamping force in the direction of the arrow 13, the taper bushings 6, 7 are slit lengthwise all the way through at one peripheral point. In FIG. 1 this is indicated for the taper sleeve 6 by the fact that its cross section is not fully hatched. The slitting can also be carried out only partially and then at several peripheral points, viewed in the longitudinal direction, as shown for the taper sleeve 7.

The axial region in which the taper bushes 6, 7 are situated in the outer component 2 and wherein the clamping force is exerted is denoted the clamping region 20.

Axially connecting to the clamping region 20 (the portion in FIG. 1 to the left of the toothed gear forming the outer component 2), the taper sleeves 6,7 have threaded extensions 14, 15 in the form of a radially projecting collar or peripheral web with external threads The threaded extension 14 bears a right-hand thread 16, the threaded extension 15 a left-hand thread 17 of equal diameter. The arrangement of the threads can also, of course, be the other way around.

On the threads 16, 17 sits a screw sleeve 30 with two adjacent internal threads 18, 19 in the axial direction. These internal threads 18, 19 interact with the threads 16, 17 when the screw sleeve is turned, for example, by engaging a turning tool in lengthwise grooves 31 distributed around the periphery.

When the screw sleeve 30 is turned in one direction the taper bushing 6 is displaced relative to the taper bushing 7, for example, in the direction indicated by the arrow 3. When the screw sleeve 30 is turned in the other direction, it is displaced in the opposite direction. In one direction the outer component 2 is clamped on the shaft 1, while in the other direction the self-locking taper clamping connection formed by the taper bushings 6, 7 is released.

As can be seen from FIG. 1, the screw sleeve 30 and the threaded extensions 14, 15 are separated axially from the clamping region 20, and the taper bushings 6, 7 can, therefore, be made quite thin-walled in the radial direction. Thus, the diameter of the inner peripheral face 4 of the outer component 2 must only be slightly larger than the diameter of the outer peripheral face 5 of the shaft 1.

If the outer component 2 is to retain a certain position relative to the shaft 1 during clamping, this can be achieved by providing on the right edge of the inner periphery 4 an inward-projecting peripheral web 21 which lies in front of the outer end face of the inner taper bushing 7. If the outer component 2 is to be fixed on the end of the shaft 1, the peripheral web 21 may also lie in front of the end of the shaft 1.

Figure 2:
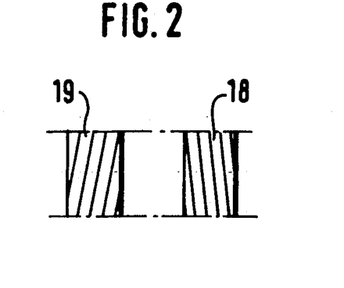
FIGS. 2 and 3 are schematic views of the thread region of the screw sleeve.
Figure 3:
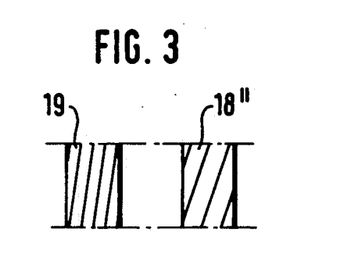

FIGS. 2 and 3 show schematically exemplary thread formations of the screw sleeve 30. Similar thread formations may, of course, be formed for the threaded extensions 14, 15. The thread pitch is shown exaggerated for the sake of greater clarity.

In FIG. 2 the thread 18 is a single left-hand thread, and the thread 19 is a single right-hand thread of the same pitch. The pitches can, however, be different if so desired. In the embodiment shown in FIG. 3, the thread 19 is again a single right-hand thread, and the thread 18" is also a right-hand thread, but with double the pitch. In this embodiment also, the parts driven by the threads 19, 18" shift axially towards each other on turning of the screw sleeve 30.

In the clamping set 100 shown in FIG. 1, the threaded extension 14 is disposed on the thin-walled end of the outer taper bushing 6 and the threaded extension 15 is disposed on the thick-walled end of the inner taper bushing 7. This arrangement is reversed in the clamping set 400 shown in FIG. 4. The threaded extension 14 sits on the thick-walled end of the outer taper bushing 6', while the threaded extension 15 is on the thin-walled end of the inner taper bushing 7'. Upon tightening the screw sleeve 30', the clamping occurs in the clamping region 20 by the taper bushing 6' being pushed upwards on the taper bushing 7'.

Figure 4:
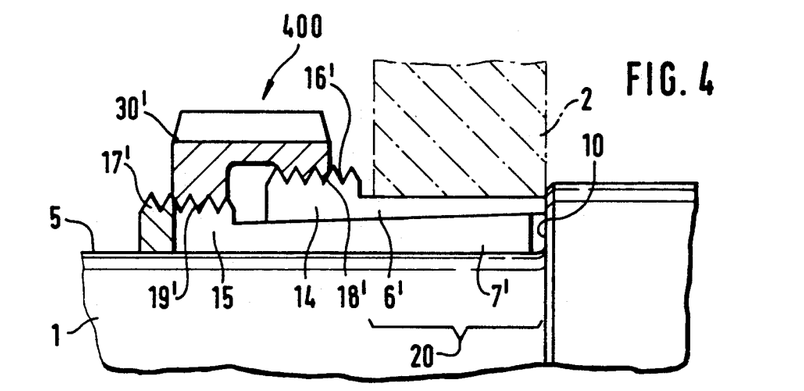
FIG. 4 is a view of the upper part of a further embodiment of the invention, partially in a longitudinal section through the axis.

Another difference from the clamping set 100 is that the interacting threads 16', 18' and 17', 19' have different diameters, so that the thread bushing 30' is a stepped bushing.

If the clamping set 400 is placed, as shown in FIG. 4, against a shoulder 10 of the shaft 1, so that the right end face of the outer taper bushing 6' and/or the right side of the outer component 2 rests against the setting 10, the outer component 2 remains exactly in place during clamping of the clamping set 400 in the axial direction.

Figure 5:
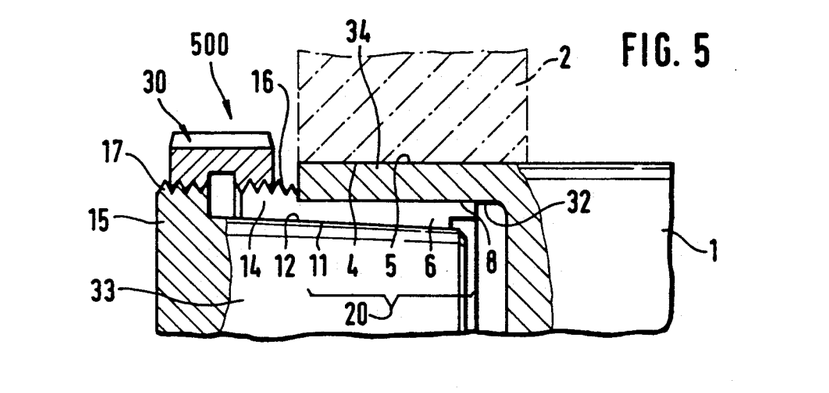
FIG. 5 is a corresponding view of a further embodiment.

Referring now to the clamping set 500 shown in FIG. 5, the outer component 2 is disposed with its cylindrical inner peripheral face 4 directly on the cylindrical outer peripheral face 5 of the shaft 1 on the end thereof. The shaft 1 has a coaxial cylindrical recess 32, thereby leaving only a peripheral wall 34 of relatively low residual wall thickness. Disposed in the recess 32 is the clamping set 500, which comprises an outer taper bushing 6, which has axially a threaded extension 14 outside the clamping region 20. The threaded extension 14 has an external thread 16 which is right-handed or left-handed outside in front of the end face of the shaft 1.

Disposed in the taper bushing 6 is a conical inner element 33. At its thicker end axially outside the threaded extension 14, the conical inner element bears a radially projection threaded extension 15 with an external thread 17. The external thread has the same diameter, but opposite pitch, similar to the external thread 16 on the threaded extension 14. The screw sleeve 30, which corresponds to the screw sleeve 30 in FIG. 1, interacts with the threads 16, 17. When the clamping set 500 is clamped by turning the screw sleeve 30, the peripheral wall 34 of the recess 32 is opened out radially and the components 1, 2 are clamped together on the peripheral faces 5, 4 so that they cannot rotate.

Instead of acting with an appropriate turning tool, for example a hooked wrench, a special turning tool can be provided according to FIGS. 6 to 9 for use in grooves 31 on the periphery of the screw sleeve 30 for tightening the screw sleeve 30.

Figure 6:
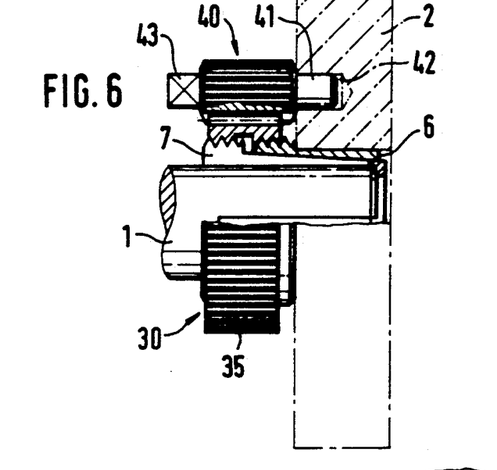
FIG. 6 shows schematically the function of a turning tool.
Figure 7:
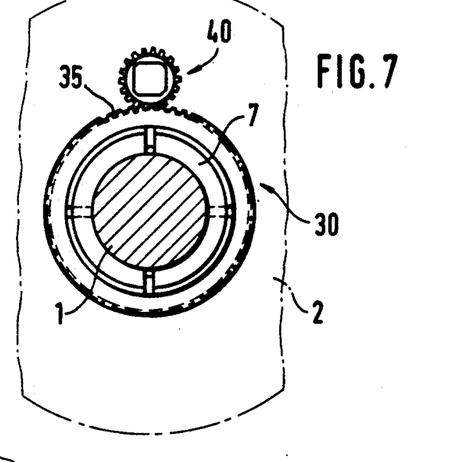
FIG. 7 is a partial view according to FIG. 6 from the left.

In the embodiment shown in FIGS. 6 and 7, the screw sleeve 30 has on its outer periphery a toothing 35, which is engaged by the toothing of a pinion 40. The pinion 40 is rotatably mounted with a pin 41 in a concentric bore 42 of the outer component 2, and has at the other end a projection 43 with key faces on which a crank or a wrench can grip. The diameter of the pitch circle of the toothing of the pinion 40 in the shown embodiment is only approximately a quarter of the pitch circle of the toothing 35, so that for a given torque for turning the pinion 40 approximately four times the torque is exerted on the screw sleeve 30.

Figure 8:
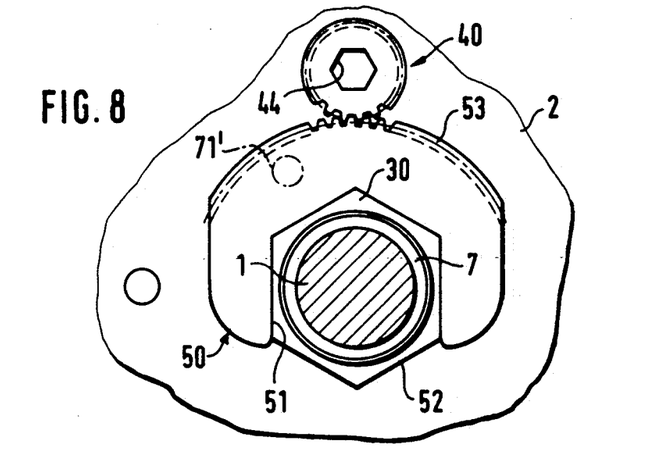
FIGS. 8 and 9 are corresponding partial views of further embodiments of the turning tool.

An alternative embodiment is shown in FIG. 8. A tool 50 is provided having a wrench jaw 51 which fits on an outer hexagon 52 of the screw sleeve 30. At the side facing away from the jaw 51 the tool 50 has a toothing 53, in which the toothing of the pinion 40 engages. When the pinion 40 is turned on the inner hexagon 44 the screw sleeve 30 is also turned, as in the embodiment shown in FIGS. 6 and 7. The advantage of this embodiment is that the tool 50 can be placed from the side on the screw sleeve 30 and therefore no open end of the shaft 1 is required. Additionally, the toothing 53 need only be provided once, namely on the tool 50, while in the embodiment shown in FIGS. 6 and 7 each individual screw sleeve must have a toothing.

During the tightening of the screw sleeve 30 shown in FIG. 8, the pinion has reached the end of the toothing 53 extending only through an angle of approximately 90°. At this point the tool 50 is replaced appropriately on the screw sleeve 30.

Figure 9:
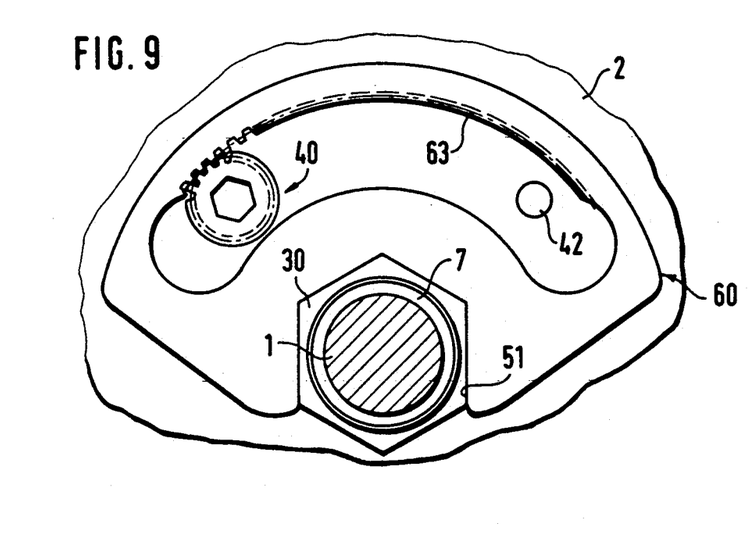

The tool 60, shown in FIG. 9, differs from the tool 50 in that, instead of the outer toothing 53, a circular recess 61 with a toothing 63 disposed on the radial outer limit is provided. The toothing of the pinion 40 thus engages from the inside. The circular recess 61 of the tool 60 is so wide that the pinion 40 (lacuna) engages only the outer toothing 63, and because of the inner limit the pinion 40 will not jump out of the circular recess 61.

Figure 10:
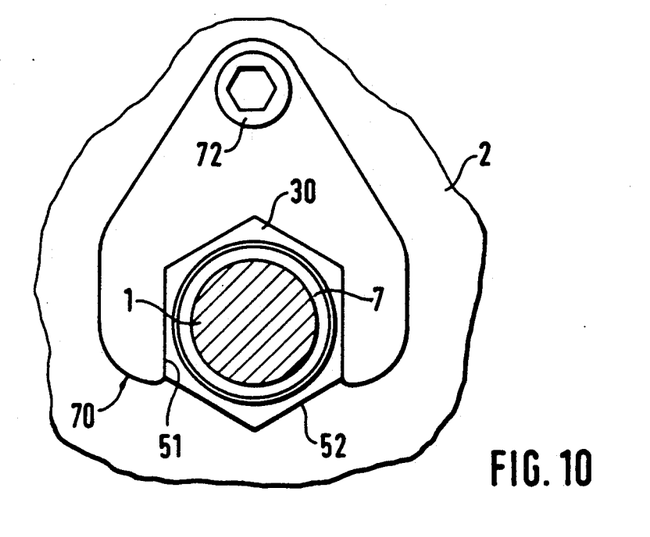
FIGS. 10 and 11 are views according to FIGS. 7 and 6, respectively, showing a further embodiment of the present invention.
Figure 11:
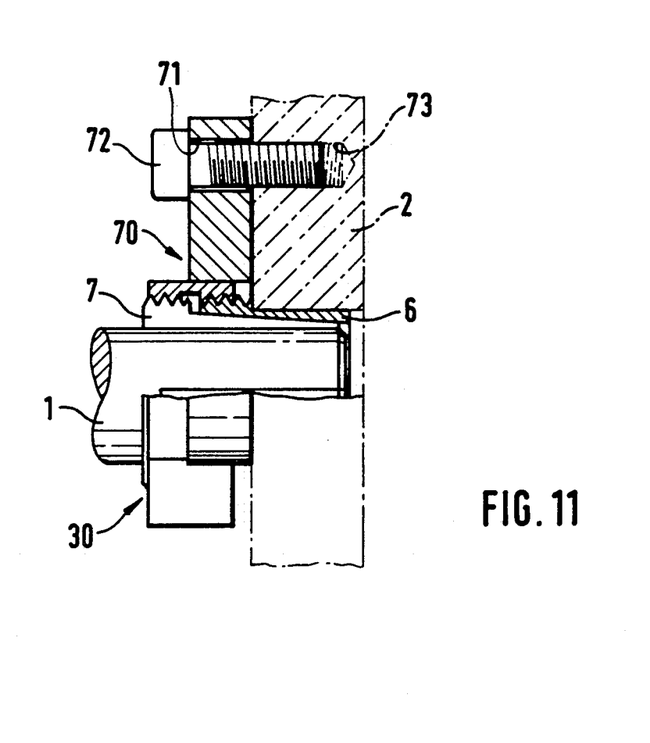

In FIGS. 10 and 11 a further embodiment is shown wherein a torque support 70 is mounted on a clamping set 6, 7, 30. In this embodiment the screw sleeve 30 has a hexagon 52, and the torque support 70 is formed as a plate with a wrench jaw 51, which fits on the outer hexagon 52. The wrench jaw 51 forms a section matched to the outer periphery of hexagon 52. A perforation is provided perpendicular to the plane of the plate through which a screw 72 extends and meshes in a screw thread 73 of the outer component 2. Thus, the torque support 70 connects screw sleeve 30 with the outer component 2 so that they cannot rotate. More importantly, however, because the taper rings 6, 7 sit tightly on each other when the screw sleeve is screwed down due to the self-locking angle, torque support 70 functions primarily when the maximum torque of the clamping set is transgressed, i.e. when it slips through on the shaft 1. Then the outer component 2 takes the torque support 70 and the screw sleeve 30 in the direction of the torque so that, according to the arrangement of the threads, the taper rings 6, 7 are either released or screwed down more tightly. The former can be desirable in order to find relief when the torque is too large and to prevent the cooperating cylindrical faces of the shaft 1 and the taper ring 7 from being ruined. The latter is desirable in order to intercept the increased torque by immediate tightening of the clamping set. In the case of equal sense of rotation the effect of the torque support 70 can be changed by turning around the clamping set and mounting the torque support 70 on the other axial side of outer component 2.

A torque support can be also realized in the embodiment of FIG. 8. The tool 50 in FIG. 8 is left on the screw sleeve 30 after tightening and by the means of a screw, which is mounted out of the wrench jaw 51 and goes through the boring 71' (outlined in a dot-dash line), is rotatably connected with the outer component 2.

The thickness of the torque support should not be too small so that the screw sleeve can be taken safely in longitudinal direction even in different positions.

What is claimed is:

1. A clamping set for the transmission of torques between at least one inner shaft component having a cylindrical outer peripheral face and at least one outer hub component having a recess in which the inner component engages concentrically, and also having a cylindrical inner peripheral face, said clamping set comprising:
   an outer taper bushing having a cylindrical outer peripheral face disposed to rest against the inner peripheral face of the outer component and an inner taper face coaxial with the outer peripheral face and having a taper angle lying in the self-locking region;
   an inner taper bushing having a cylindrical inner peripheral face disposed to rest against the outer peripheral face of the inner component and an outer taper face coaxial with the inner peripheral face and having a taper angle equal to that of the inner taper face;
   a screw sleeve which surrounds the inner taper bushing and is screwed with a first internal thread on an externally threaded extension of the inner taper bushing thereby connecting axially to a clamping region of the outer taper face; and
   a longitudinal stop on the outer component engaging with the end of the inner taper bushing;
   said screw sleeve being arranged axially outside a side portion of the outer component thereby drawing the taper bushings towards each other and pressing away from each other axially while gliding over the taper faces;
   said outer taper bushing having an externally threaded extension connecting axially to the clamping region of the inner taper face, said outer taper bushing being arranged axially outside the side portion of the outer component;
   said screw sleeve having a second internal thread of different pitch axially adjacent to the first internal thread;
   the second internal thread of the screw sleeve engaging with the external thread of the outer taper bushing;
   the externally threaded extension of the outer taper busing being disposed on a thin-walled end of the outer taper bushing and the threaded extension of the inner taper bushing being disposed on a thick-walled end of the inner taper bushing.

2. The clamping set as claimed in claim 1, wherein the two internal threads comprise a right-hand thread and a left-hand thread.

3. The clamping set as claimed in claim 1, wherein the two internal threads comprise threads running in the same direction and of different pitches.

4. The clamping set as claimed in claim 1, wherein the radii of the internal and external threads of different pitch are the same.

5. The clamping set as claimed in claim 1, wherein the radii of the internal and external threads of different pitch are different.

6. A clamping set for the transmission of torques between at least one inner shaft component having a cylindrical outer peripheral face and at least one outer hub component having a recess in which the inner component engages concentrically, and also having a cylindrical inner peripheral face, said clamping set comprising:
   an outer taper bushing having a cylindrical outer peripheral face disposed to rest against the inner peripheral face of the outer component and an inner taper face coaxial with the outer peripheral face and having a taper angle lying in the self-locking region;
   an inner taper bushing having a cylindrical inner peripheral face disposed to rest against the outer peripheral face of the inner component and an outer taper face coaxial with the inner peripheral face and having a taper angle equal to that of the inner taper face;
   a screw sleeve which surrounds the inner taper bushing and is screwed with a first internal thread on an externally threaded extension of the inner taper bushing thereby connecting axially to a clamping region of the outer taper face;
   said screw sleeve being arranged axially outside a side portion of the outer component thereby drawing the taper bushings towards each other and pressing away from each other axially while gliding over the taper faces;

said outer taper bushing having an externally threaded extension connecting axially to the clamping region of the inner taper face, said outer taper bushing being arranged axially outside the side portion of the outer component;

said screw sleeve having a second internal thread of different pitch axially adjacent to the first internal thread;

the second internal thread of the screw sleeve engaging with the external thread of the outer taper bushing;

the externally threaded extension of the outer taper bushing being disposed on a thin-walled end of the outer taper bushing and the threaded extension of the inner taper bushing being disposed on a thick-walled end of the inner taper bushing; and the taper faces extending axially and radially inwardly of the threaded extension facing the outer component.

7. A clamping set for the transmission of torques between at least one inner shaft component having a cylindrical outer peripheral face and at least one outer hub component having a recess in which the inner component engages concentrically, and also having a cylindrical inner peripheral face, said clamping set comprising:

an outer taper bushing having a cylindrical outer peripheral face disposed to rest against the inner peripheral face of the outer component and an inner taper face coaxial with the outer peripheral face and having a taper angle lying in the self-locking region;

an inner taper bushing having a cylindrical inner peripheral face disposed to rest against the outer peripheral face of the inner component and an outer taper face coaxial with the inner peripheral face and having a taper angle equal to that of the inner taper face;

a screw sleeve which surrounds the inner taper bushing and is screwed with a first internal thread on an externally threaded extension of the inner taper bushing thereby connecting axially to a clamping region of the outer taper face; and a longitudinal stop on the inner component, engaging on the outer taper bushing;

said screw sleeve being arranged axially outside a side portion of the outer component thereby drawing the taper bushings towards each other and pressing away from each other axially while gliding over the taper faces;

said outer taper bushing having an externally threaded extension connecting axially to the clamping region of the inner taper face, said outer taper bushing being arranged axially outside the side portion of the outer component;

said screw sleeve having a second internal thread of different pitch axially adjacent to the first internal thread;

the second internal thread of the screw sleeve engaging with the external thread of the outer taper bushing; and the externally threaded extension of the outer taper bushing being disposed on a thick-walled end of the outer taper bushing and the threaded extension of the inner taper ring being disposed on a thin-walled end of the inner taper bushing.

8. A clamping set for the transmission of torques between at least one inner shaft component having a cylindrical outer peripheral face and at least one outer hub component having a recess in which the inner component engages concentrically, and also having a cylindrical inner peripheral face, said clamping set comprising:

an outer taper bushing having a cylindrical outer peripheral face disposed to rest against the inner peripheral face of the outer component and an inner taper face coaxial with the outer peripheral face and having a taper angle laying in the self-locking region;

an inner taper bushing having a cylindrical inner peripheral face disposed to rest against the outer peripheral face of the inner component and an outer taper face coaxial with the inner peripheral face and having a taper angle equal to that of the inner taper face;

a screw sleeve which surrounds the inner taper bushing and is screwed with a first internal thread on an externally threaded extension of the inner taper bushing thereby connecting axially to a clamping region of the outer taper face; and a turning tool resting on a pivot pin on the outer component and engaging on the periphery of the screw sleeve;

said screw sleeve being arranged axially outside a side portion of the outer component thereby drawing the taper bushings towards each other and pressing away from each other axially while gliding over the taper faces;

said outer taper bushing having an externally threaded extension connecting axially to the clamping region of the inner taper face, said outer taper bushing being arranged axially outside the side portion of the outer component;

said screw sleeve having a second internal thread of different pitch axially adjacent to the first internal thread;

the second internal thread of the screw sleeve engaging with the external thread of the outer taper bushing.

9. The clamping set as claimed in claim 8, wherein the turning tool comprises a toothed pinion having a pitch circle diameter substantially smaller than the external diameter of the screw sleeve.

10. The clamping set as claimed in claim 9, wherein the screw sleeve has on the outer periphery thereof a toothing corresponding to that of the pinion.

11. The clamping set as claimed in claim 9, further comprising a tool placed on the screw sleeve so that the screw sleeve does not turn said tool having toothing on the periphery thereof.

12. The clamping set as claimed in claim 11, wherein the tool can be placed in various angular positions on the screw sleeve and the toothing forms in a circular arc corresponding to at least one angular step.

13. The clamping set as claimed in claim 9, wherein a concentric bore is provided in the outer component, wherein the pinion is rotatable within said bore about the pivot pin.

14. A clamping set for the transmission of torques between at least one inner shaft component having a cylindrical outer peripheral face and at least one outer hub component having a recess in which the inner component engages concentrically, and also having a cylindrical inner peripheral face, said clamping set comprising:
- an outer taper bushing having a cylindrical outer peripheral face disposed to rest against the inner peripheral face of the outer component and an inner taper face coaxial with the outer peripheral face and having a taper angle lying in the self-locking region;
- an inner taper bushing having a cylindrical inner peripheral face disposed to rest against the outer peripheral face of the inner component and an outer taper face coaxial with the inner peripheral face and having a taper angle equal to that of the inner taper face;
- a screw sleeve which surrounds the inner taper bushing and is screwed with a first internal thread on an externally threaded extension of the inner taper bushing thereby connecting axially to a clamping region of the outer taper face; and
- a torque support for the screw sleeve which acts on the outer component;
- said screw sleeve being arranged axially outside a side portion of the outer component thereby drawing the taper bushings towards each other and pressing away from each other axially while gliding over the taper faces;
- said outer taper bushing having an externally threaded extension connecting axially to the clamping region of the inner taper face, said outer taper bushing being arranged axially outside the side portion of the outer component;
- said screw sleeve having a second internal thread of different pitch axially adjacent to the first internal thread;
- the second internal thread of the screw sleeve engaging with the external thread of the outer taper bushing.

15. The clamping set as claimed in claim 14, wherein the torque support is formed as a plate, having a section matched to a non-circular outer periphery of the screw sleeve, said torque support having a perforation for receiving a screw which meshes in the outer component.

16. The clamping set as claimed in claim 15, wherein the torque support is formed by a tool having said perforation formed therethrough for receiving said screw.

17. A clamping set for the transmission of torque between an inner shaft component having a cylindrical outer peripheral face and at least one outer hub component having a cylindrical inner peripheral face which is disposed on the cylindrical outer peripheral face of the inner component adjacent to an axial end of the inner component, said clamping set comprising:
- means for defining an open concentric cylindrical recess provided on the end of the inner component;
- an outer taper bushing having a cylindrical outer peripheral face disposed to rest in the recess and having coaxial thereto an inner taper face with a taper angle lying in the self-locking region;
- a conical inner element having an outer taper face disposed to rest on the inner taper face of the taper bushing and having a taper angle equal to that of the inner taper face;
- a screw arrangement means for axially drawing the taper bushing and the conical inner element towards each other and for pressing away from each other axially while gliding over the taper faces;
- a longitudinal stop on the outer component engaging with a shaft end;
- said conical inner element having an externally threaded extension connecting axially to a clamping region of the taper face and being arranged axially outside a side portion of the outer component;
- said outer taper bushing having an externally threaded extension connecting axially to the clamping region of the inner taper face and being arranged axially outside the side portion of the outer component;
- a screw sleeve having two axially adjacent internal threads of different pitch which enclose the conical inner element;
- one of said internal threads of the screw sleeve engaging the externally threaded extension of the outer taper bushing, while the other of said internal threads of the screw sleeve engages on the externally threaded extension of the conical inner element; and
- the externally threaded extension of the outer taper bushing being disposed on a thin-walled end of the outer taper bushing and the threaded extension of the inner taper bushing being disposed on a thick-walled end of the conical inner element.

18. The clamping set as claimed in claim 17, wherein the two internal threads comprise a right-hand thread and a left-hand thread.

19. The clamping set as claimed in claim 17, wherein the two internal threads comprise threads running in the same direction and of different pitches.

20. The clamping set as claimed in claim 17, wherein the radii of the internal and external threads of different pitch are the same.

21. The clamping set as claimed in claim 17, wherein the radii of the internal and external threads of different pitch are different.

22. A clamping set for the transmission of torque between in inner shaft component having a cylindrical outer peripheral face and at least one outer hub component having a cylindrical inner peripheral face which is disposed n the cylindrical outer peripheral face of the inner component adjacent to an axial end of the inner component, said clamping set comprising:
- means for defining an open concentric cylindrical recess provided on the end of the inner component;
- an outer taper bushing having a cylindrical outer peripheral face disposed to rest in the recess and having coaxial thereto an inner taper face with a taper angle lying in the self-locking region;
- a conical inner element having an outer taper face disposed to rest on the inner taper face of the taper bushing and having a taper angle equal to that of the inner taper face;
- a screw arrangement means for axially drawing the taper bushing and the conical inner element towards each other and for pressing away from each other axially while gliding over the taper faces;
- a longitudinal stop of the inner component, engaging on the outer taper bushing;
- said conical inner element having an externally threaded extension connecting axially to a clamping region of the taper face and being arranged axially outside a side portion of the outer component;

said outer taper bushing having an externally threaded extension connecting axially to the clamping region of the inner taper face and being arranged axially outside the side portion of the outer component;

a screw sleeve having two axially adjacent internal threads of different pitch which enclose the conical inner element;

one of said internal threads of the screw sleeve engaging the externally threaded extension of the outer taper bushing, while the other of said internal threads of the screw sleeve engages on the externally threaded extension of the conical inner element; and the externally threaded extension of the outer taper bushing being disposed on a thick-walled end of the outer taper bushing and threaded extension of the inner taper ring being disposed on a thin-walled end of the conical inner element.

23. A clamping set for the transmission of torque between an inner shaft component having a cylindrical outer peripheral face and at least one outer hub component having a cylindrical inner peripheral face which is disposed on the cylindrical outer peripheral face of the inner component adjacent to an axial end of the inner component, said clamping set comprising:

means for defining an open concentric cylindrical recess provided on the end of the inner component;

an outer taper bushing having a cylindrical outer peripheral face disposed to rest in the recess and having coaxial thereto an inner taper face with a taper angle lying in the self-locking region;

a conical inner element having an outer taper face disposed to rest on the inner taper face of the taper bushing and having a taper angle equal to that of the inner taper face;

a screw arrangement means for axially drawing the taper bushing and the conical inner element towards each other and for pressing away from each other axially while gliding over the taper faces;

said conical inner element having an externally threaded extension connecting axially to a clamping region of the taper face and being arranged axially outside a side portion of the outer component;

said outer taper bushing having an externally threaded extension connecting axially to the clamping region of the inner taper face and being arranged axially outside the side portion of the outer component;

a screw sleeve having two axially adjacent internal threads of different pitch which enclose the conical inner element;

one of said internal threads of the screw sleeve engaging the externally threaded extension of the outer taper bushing, while the other of said internal threads of the screw sleeve engages on the externally threaded extension of the conical inner element; and a turning tool resting on a pivot pin on the outer component and engaging on the periphery of the screw sleeve.

24. The clamping set as claimed in claim 23, wherein the turning tool comprises a toothed pinion having a pitch circle diameter substantially smaller than the external diameter of the screw sleeve.

25. The clamping set as claimed in claim 24, wherein the screw sleeve has on the outer periphery thereof a toothing corresponding to that of the pinion.

26. The clamping set as claimed in claim 24, further comprising a tool placed on the screw sleeve so that the screw sleeve does not turn said tool having toothing on the periphery thereof.

27. The clamping set as claimed in claim 26, wherein the tool can be placed in various angular positions on the screw sleeve and the toothing forms in a circular arc corresponding to at least one angular step.

28. The clamping set as claimed in claim 24, wherein a concentric bore is provided in the outer component, wherein the pinion is rotatable within said concentric bore about the pivot pin.

29. A clamping set for the transmission of torque between an inner shaft component having a cylindrical outer peripheral face and at least one outer hub component having a cylindrical inner peripheral face which is disposed on the cylindrical outer peripheral face of the inner component adjacent to an axial end of the inner component, said clamping set comprising:

means for defining an open concentric cylindrical recess provided on the end of the inner component;

an outer taper bushing having a cylindrical outer peripheral face disposed to rest in the recess and having coaxial thereto an inner taper face with a taper angle lying the self-locking region;

a conical inner element having an outer taper face disposed to rest on the inner taper face of the taper bushing and having a taper angle equal to that of the inner taper face;

a screw arrangement means for axially drawing the taper bushing and the conical inner element towards each other and for pressing away from each other axially while gliding over the taper faces;

said conical inner element having an externally threaded extension connecting axially to a clamping region of the taper face and being arranged axially outside a side portion of the outer component;

said outer taper bushing having an externally threaded extension connecting axially to the clamping region of the inner taper face and being arranged axially outside the side portion of the outer component;

a screw sleeve having two axially adjacent internal threads of different pitch which enclose the conical inner element;

one of said internal threads of the screw sleeve engaging the externally threaded extension of the outer taper bushing, while the other of said internal threads of the screw sleeve engages on the externally threaded extension of the conical inner element; and a torque support for the screw sleeve which acts on the outer component.

30. The clamping set as claimed in claim 29, wherein the torque support is formed as a plate, having a section matched to a non-circular outer periphery of the screw sleeve, said torque support having a perforation for receiving a screw which meshes in the outer component.

31. The clamping set as claimed in claim 30, wherein the torque support is formed by a tool having said perforation formed therein for receiving said screw.

* * * * *